United States Patent
Shinoda et al.

(10) Patent No.: US 10,452,049 B2
(45) Date of Patent: Oct. 22, 2019

(54) SERVOMOTOR CONTROL DEVICE, AND SERVOMOTOR CONTROL SYSTEM

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/914,350

(22) Filed: Mar. 7, 2018

(65) Prior Publication Data
US 2018/0259932 A1    Sep. 13, 2018

(30) Foreign Application Priority Data
Mar. 13, 2017  (JP) ................. 2017-047340

(51) Int. Cl.
G05B 19/19       (2006.01)
G01D 1/16        (2006.01)
G01D 5/244       (2006.01)

(52) U.S. Cl.
CPC ........... G05B 19/19 (2013.01); G01D 1/16 (2013.01); G01D 5/24476 (2013.01); G05B 2219/41139 (2013.01); G05B 2219/49194 (2013.01); G05B 2219/50063 (2013.01)

(58) Field of Classification Search
None
See application file for complete search history.

(56) References Cited

U.S. PATENT DOCUMENTS

| 5,396,804 A | 3/1995 | Moet et al. |
| 9,452,532 B2* | 9/2016 | Komatsu ............... B25J 9/1676 |
| 9,855,967 B2* | 1/2018 | Hirate ................. B62D 5/0463 |

(Continued)

FOREIGN PATENT DOCUMENTS

| CN | 101506639 A | 8/2009 |
| CN | 102183437 A | 9/2011 |

(Continued)

OTHER PUBLICATIONS

An Office Action mailed by the Japanese Patent Office dated Jul. 24, 2018, which corresponds to Japanese Patent Application No. 2017-047340 and is related to U.S. Appl. No. 15/914,350.

(Continued)

*Primary Examiner* — Bickey Dhakal
(74) *Attorney, Agent, or Firm* — Studebaker & Brackett PC

(57) ABSTRACT

A servomotor control device includes: a servomotor; a driven body that is driven by way of the servomotor; a connection mechanism that connects the servomotor and the driven body to transmit power of the servomotor to the driven body; and a motor control unit that controls the servomotor, in which the motor control unit includes: a force acquisition section that acquires a drive force acting on the driven body at a connection part between the connection mechanism and the driven body; and a rigidity estimation section that estimates a magnitude of rigidity of the connection mechanism, based on position information of the servomotor and a drive force acquired by the force acquisition section when causing the servomotor to rotate in a state mechanically fixing the driven body.

12 Claims, 8 Drawing Sheets

(56) References Cited

U.S. PATENT DOCUMENTS

| | | | |
|---|---|---|---|
| 10,152,042 B2* | 12/2018 | Shinoda | G05B 19/402 |
| 2010/0152896 A1* | 6/2010 | Komatsu | B25J 9/0003 |
| | | | 700/258 |
| 2011/0270444 A1* | 11/2011 | Nagata | B25J 9/1633 |
| | | | 700/258 |

FOREIGN PATENT DOCUMENTS

| | | | |
|---|---|---|---|
| DE | 10 2014 203 720 A1 | 9/2015 | |
| JP | H06-269188 A | 9/1994 | |
| JP | H11-237920 A | 8/1999 | |
| JP | H11-345025 A | 12/1999 | |
| WO | WO-2008126474 A1 * | 10/2008 | B60T 7/22 |
| WO | 2014/156164 A1 | 10/2014 | |
| WO | 2015/111298 A1 | 7/2015 | |

OTHER PUBLICATIONS

An Office Action mailed by the German Patent Office dated Jul. 17, 2019, which corresponds to German Patent Application No. 10 2018 001 787.8 and is related to U.S. Appl. No. 15/914,350; with partial English translation.

* cited by examiner

SERVOMOTOR CONTROL DEVICE, AND SERVOMOTOR CONTROL SYSTEM

This application is based on and claims the benefit of priority from Japanese Patent Application No. 2017-047340, filed on 13 Mar. 2017, the content of which is incorporated herein by reference.

BACKGROUND OF THE INVENTION

Field of the Invention

The present invention relates to a servomotor control device and servomotor control system which have a self-monitoring function for aging in the rigidity of a connection mechanism that connects a servomotor and driven body and transmits drive power of the servomotor to the driven body.

Related Art

For example, a servomotor control device has been known that controls the position of a workpiece (work) using servomotors in a machine tool or the like. The servomotor control device mounts the workpiece on a table (driven body) (also referred to as mobile body), and causes the table to move by a servomotor via the connection mechanism. The connection mechanism has a coupling connected to a servomotor, a ball screw that is fixed to the coupling, and a nut that is threaded with the ball screw, and connected to the table. When causing the ball screw to rotate by way of the servomotor, the nut threaded to the ball screw is driven in the axial direction of the ball screw, and the table connected to the nut is thereby moved.

With such a connection mechanism (particularly the coupling and ball screw), the rigidity is relatively low, and elastic deformation occurs. When the connection mechanism elastically deforms, error in the amount of elastic deformation arises in the position of the table. Concerning this point, technology for correcting the position of the table has been known.

Patent Documents 1 and 2 disclose technology for correcting positional error (positioning error) caused by aging of rigidity of the connection mechanism, based on the rotation amount of the servomotor detected by an encoder in the servomotor (semi-closed feedback value), and a movement amount of the table detected by a linear scale fixed to the table (full-closed feedback value).

Patent Document 1: Japanese Unexamined Patent Application, Publication No. H11-345025
Patent Document 2: Japanese Unexamined Patent Application, Publication No. H11-237920

SUMMARY OF THE INVENTION

With the technology described in Patent Documents 1 and 2, it has been necessary to both use a linear scale in addition to the encoder of the servomotor, and to use full-closed feedback value from the linear scale in addition to the semi-closed feedback value from the encoder of the servomotor.

The present invention has an object of providing a servomotor control device and servomotor control system which estimate the magnitude of rigidity of a connection mechanism that connects a servomotor and a driven body, without using full-closed feedback values.

(1) A servomotor control device (e.g., the servomotor control device 1, 1A, 1B, 1C described later) according to the present invention includes: a servomotor (e.g., the servomotor 50 described later); a driven body (e.g., the table 70 described later) that is driven by way of the servomotor; a connection mechanism (e.g., the connection mechanism 60 described later) that connects the servomotor and the driven body to transmit power of the servomotor to the driven body; and a motor control unit (e.g., the motor control unit 10, 10A, 10B, 10C described later) that controls the servomotor, in which the motor control unit includes: a force acquisition section (e.g., the force acquisition section 20 described later) that acquires a drive force acting on the driven body at a connection part between the connection mechanism and the driven body; and a rigidity estimation section (e.g., the rigidity estimation section 22 described later) that estimates a magnitude of rigidity of the connection mechanism, based on position information of the servomotor and a drive force acquired by the force acquisition section when causing the servomotor to rotate in a state mechanically fixing the driven body.

(2) In the servomotor control device described in (1), the motor control unit may further include a deterioration detection section (e.g., the deterioration detection section 28A described later) that detects deterioration of the connection mechanism based on the magnitude of rigidity estimated by the rigidity estimation section.

(3) In the servomotor control device described in (2), the deterioration detection section may detect deterioration of the connection mechanism, when the magnitude of rigidity estimated by the rigidity estimation section has declined to no more than a predetermined first threshold.

(4) In the servomotor control device described in (1), the motor control unit may further include: a storage section (e.g., the storage section 24 described later) that stores a plurality of magnitudes of rigidity estimated by the rigidity estimation section at every predetermined time interval or indefinite time interval, as rigidity data; and a rigidity variation detection section (e.g., the rigidity variation detection section 28B described later) that detects a change and variation in the rigidity of the connection mechanism (60), based on the rigidity data stored in the storage section.

(5) In the servomotor control device described in (1), the motor control unit may further include: a communication section (e.g., the communication section 26 described later) that performs communication with another servomotor control device; a storage section. (e.g., the storage section 24 described later) that stores rigidity data of its own device in which a plurality of magnitudes of rigidity of its own device estimated by the rigidity estimation section at every predetermined time interval or indefinite time interval and operating amounts are associated, and stores rigidity data of another device, in which a plurality of magnitudes of rigidity of another device at every predetermined time interval or indefinite time internal and operating amounts are associated, acquired by the communication section; and an operating amount estimation section (e.g., the operating amount estimation section 28C described later) that derives a trend for change in rigidity based on the rigidity data of another device stored in the storage section, and estimates a remaining operable amount of the connection mechanism until the magnitude of rigidity declines to no more than a predetermined second threshold, based on the trend for change in rigidity thus derived, and the rigidity data of its own device stored in the storage section.

(6) In the servomotor control device described in (1), the motor control unit may further include: a storage section (e.g., the storage section 24 described later) that stores rigidity data of its own device in which a plurality of magnitudes of rigidity of its own device estimated by the rigidity estimation section at every predetermined time interval or indefinite time interval and operating amounts are associated, and stores in advance trend data indicating a trend for change in rigidity of the connection mechanism; and an operating amount estimation section (e.g., the operating amount estimation section 28C described later) that estimates a remaining operable amount of the connection mechanism until the magnitude of rigidity declines to no more than a predetermined second threshold, based on the trend for change in rigidity indicated by the trend data stored in the storage section, and the rigidity data of its own device stored in the storage section.

(7) In the servomotor control device described in (2) or (3), the motor control unit may further include: a notification section (e.g., the notification section 30 described later) that notifies of information indicating the deterioration detected by the deterioration detection section.

(8) In the servomotor control device described in (4), the motor control unit may further include: a notification section (e.g., the notification section 30 described later) that notifies of information indicating at least one of the change and variation in rigidity detected by the rigidity variation detection section.

(9) In the servomotor control device described in (5) or (6), the motor control unit may further include: a notification section (e.g., the notification section 30 described later) that notifies information indicating the operable amount estimated by the operating amount estimation section.

(10) In the servomotor control device described in any one of (7) to (9), the notification section may be a display device that displays information. (11) In the servomotor control device described in (1), the motor control unit may further include: a communication section (e.g., the communication section 26 described later) that sends a plurality of magnitudes of rigidity estimated by the rigidity estimation section at every predetermined time interval or indefinite time interval as rigidity data to an external storage section, and acquires the rigidity data stored in the external storage section; and a rigidity variation detection section (e.g., the rigidity detection section 28B described later) that detects a change and variation in rigidity of the connection mechanism, based on the rigidity data acquired by the communication section from the external storage section.

(12) the servomotor control device described in (1), the motor control unit may further include: a communication section (e.g., the communication section 26 described later) that sends rigidity data of its own device, in which a plurality of magnitudes of rigidity of its own device estimated by the rigidity estimation section at every predetermined time interval or indefinite time interval and operating amounts are associated, to an external storage section, and acquires the rigidity data of its own device and rigidity data of another device, in which a plurality of magnitudes of rigidity at every predetermined time interval or indefinite time interval and operating amounts are associated, stored in the external storage section; and an operating amount estimation section (e.g., the operating amount estimation section 28C described later) that derives a trend for change in rigidity based on the rigidity data of another device acquired by the communication section from the external storage section, and estimates a remaining operable amount of the connection mechanism until the magnitude of rigidity declines to no more than a predetermined second threshold, based on the trend for change in rigidity thus derived and the rigidity data of its own device acquired by the communication section from the external storage section.

(13) A servomotor control system (e.g., the servomotor control system 100 described later) according to the present invention includes: the servomotor control device described in (11) or (12); and a server device (e.g., the server device 4 described later) that is connected to the servomotor control device and includes the external storage section.

According to the present invention, it is possible to provide a servomotor control device and servomotor control system which estimate the magnitude of rigidity of a connection mechanism that connects a servomotor and a driven body, without using full-closed feedback values.

DETAILED DESCRIPTION OF THE INVENTION

Hereinafter, examples of embodiments of the present invention will be explained by referencing the attached drawings. It should be noted that the same reference symbols shall be attached to identical or corresponding portions in the respective drawings.

(Servomotor Control System)

Figure 1:
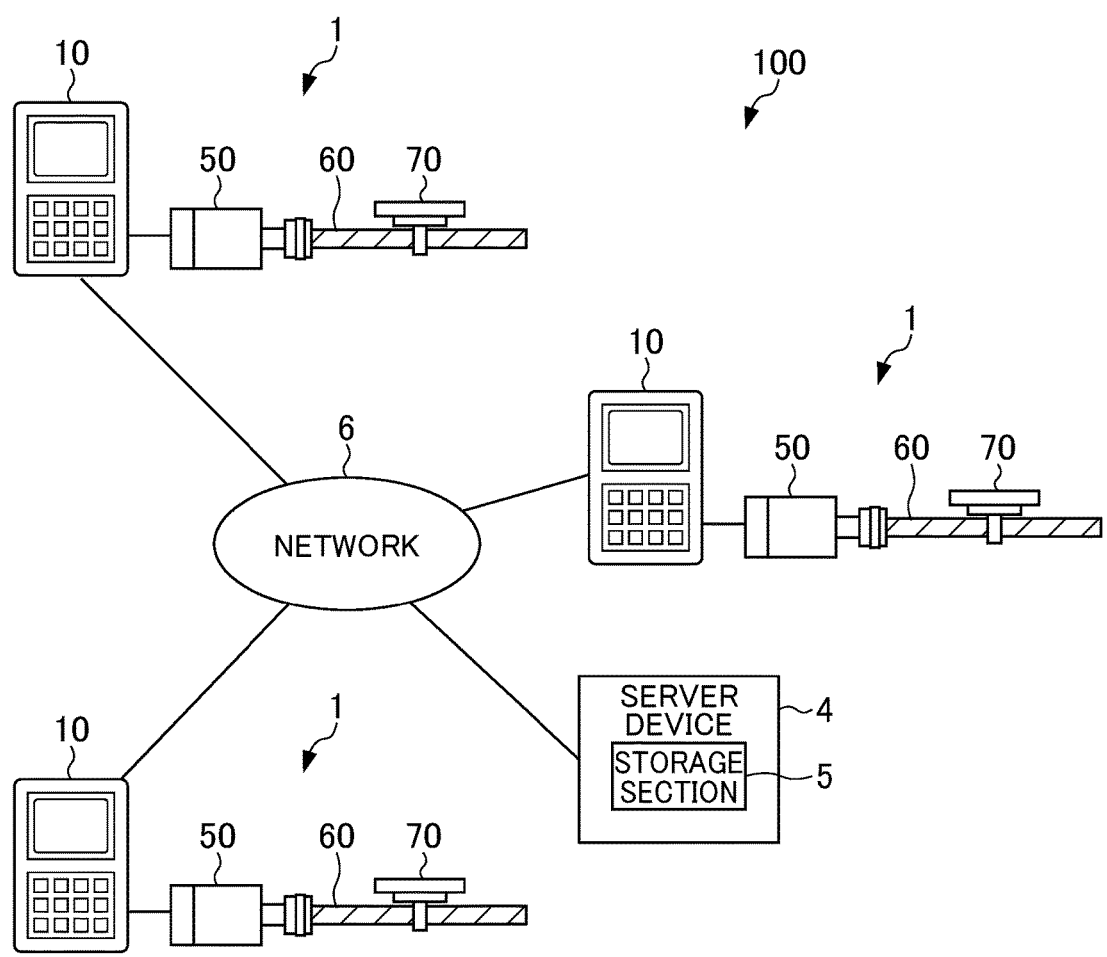
FIG. 1 is a view showing the configuration of a servomotor control system according to an embodiment of the present invention.

FIG. 1 is a view showing the configuration of a servomotor control system according to an embodiment of the present invention. As shown in FIG. 1, in the servomotor control system 100, a plurality of servomotor control devices 1 and a server device 4 are connected via a network 6.

The servomotor control device 1 drive controls the servomotor 50 by way of the motor control unit 10, and transmits the drive power of the servomotor 50 to the table (driven body) 70 via the connection mechanism 60. In addition, the servomotor control device 1 periodically monitors the aging in rigidity of the connection mechanism 60.

The plurality of servomotor control devices 1 and the server device 4 share information related to aging in rigidity of the connection mechanism 60 monitored by the respective servomotor control devices 1, via the network 6. The plurality of servomotor control devices 1 store the shared information in a storage section (refer description later) in the motor control unit 10. The server device 4 stores the shared information in a storage section 5.

The plurality of servomotor control devices 1 are servomotor control devices for the same type of machine tool, for example, and include the same connection mechanisms 60. In addition, the plurality of servomotor control devices 1 performs the same process under the same environmental conditions.

Hereinafter, although one among the plurality of servomotor control devices 1 (hereinafter referred to as own device) will be explained, it similarly applies also for other servomotor control devices 1 (hereinafter referred to as other device). Hereinafter, three embodiments will be exemplified as the servomotor control device 1.

(Servomotor Control Device of First Embodiment)

Figure 2:
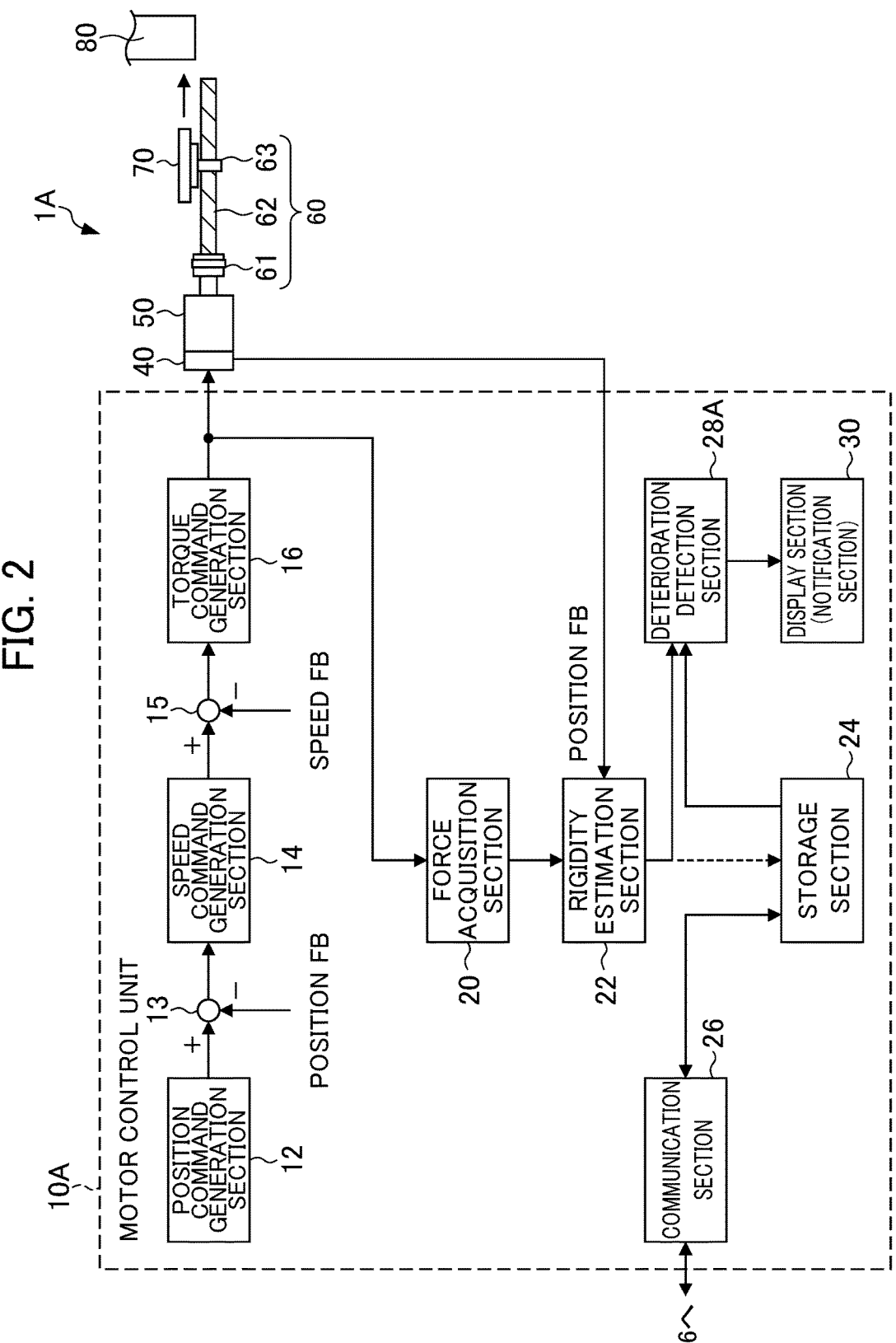
FIG. 2 is a view showing the configuration of a servomotor control device according to a first embodiment of the present invention.

FIG. 2 is a view showing the configuration of a servomotor control device according to an embodiment of the present invention. As shown in FIG. 2, a servomotor control device 1A includes a motor control unit 10A, servomotor 50, connection mechanism 60, and table (driven body) 70. The servomotor control device 1A and motor control unit 10A are examples of the servomotor control device 1 and motor control unit 10 in FIG. 1.

The servomotor control device 1A causes the table 70 to move via the connection mechanism 60 by the servomotor 50, and then processes the workpiece (work) mounted on the table 70. The connection mechanism 60 has a coupling 61 connected to the servomotor 50 and a ball screw 62 that is fixed to the coupling 61, and a nut 63 is threaded to the ball screw 62. By way of rotational driving of the servomotor 50, the nut 63 threaded to the ball screw 62 is moved in the axial direction of the ball screw 62, whereby the table 70 connected to the nut 63 is moved.

The rotation angle position of the servomotor 50 is detected by an encoder (position detection unit) 40 provided to the servomotor 50, and the detected position (rotation amount) is applied as a position feedback (position FB). It should be noted that the encoder 40 can detect rotation speed, and the detected speed is applicable as speed feedback (speed FB).

The motor control unit 10A includes a position command generation section 12, subtracters 13, 15, speed command generation section 14, torque command generation section 16, force acquisition section 20, rigidity estimation section 22, storage section 24, communication section 26, deterioration detection section 28A, and display section (notification section) 30.

The position command generation section 12 creates a position command value for the servomotor 50, in accordance with a program and/or order inputted from a higher-order control device and/or external input device (not illustrated), or the like. The subtracter 13 obtains a difference between the position command value created by the position command generation section 12, and the position detection value detected by the encoder 40. The speed command generation section 14 creates a speed command value for the servomotor 50 based on the amount of difference obtained by the subtracter 13. The subtracter 15 obtains the difference between the speed command value created by the speed command generation section 14 and the speed detection value detected by the encoder 40. The torque command generation section 16 creates a torque command value for the servomotor 50 based on the amount of difference obtained by the subtracter 15

The force acquisition section 20 acquires the drive torque (drive force) acting on the table 70 at the connection part between the table 70 (nut 63) and the connection mechanism 60, based on the torque command value from the torque command generation section 16. It should be noted that the force acquisition section 20 may acquire the drive torque based on the drive current of the servomotor 50 detected using an electrical current detector, i.e. actual electrical current (actual torque).

The rigidity estimation section 22 estimates the magnitude of rigidity of the connection mechanism 60 based on the position feedback value (position FB) of the servomotor 50 detected by the encoder 40, i.e. rotation amount (position information), and the drive torque acquired by the force acquisition section 20, when the servomotor 50 is made to rotate in a state mechanically fixing the table 70. The details of the estimation method for the magnitude of rigidity of the connection mechanism 60 will be described later.

The storage section 24 stores in advance lower limit values (first threshold and second threshold) for the rigidity of the connection mechanism 60 for satisfying the specifications of machining precision, as thresholds for deterioration detection of the connection mechanism 60. The storage section 24 is rewritable memory such as EEPROM, for example.

The communication section 26 performs transmission of data with other servomotor control devices 1 and servo devices 4 via the network 6. The communication section 26 is a communication interface following wired or wireless communication protocol such as LAN and WAN, or short-range communication protocol such as Bluetooth and Wi-Fi, or the like.

The deterioration detection section 28A detects deterioration of the connection mechanism 60 based on the magnitude of rigidity estimated by the rigidity estimation section 22. More specifically, the deterioration detection section 28A detects deterioration in the connection mechanism 60, when the magnitude of rigidity estimated by the rigidity estimation section 22 has decline to no more than the threshold stored in the storage section 24.

The display section 30 displays information indicating deterioration of the connection mechanism 60 detected by the deterioration detection section 28A (e.g., numerical values, text, images, etc.). The display section 30 is a display device such as a liquid crystal display, for example.

The motor control unit 10A (and motor control units 10B, 10C described later), for example, is configured by an arithmetic processor such as DSP (Digital Signal Processor) and FPGA (Field-Programmable Gate Array). Various functions (position command generation section 12, speed command generation section 14, torque command generation section 16, force acquisition section 20, rigidity estimation section 22, deterioration detection section 28A, and rigidity variation detection section 28B and operating amount estimation section 28C described later) of the motor control unit 10A (motor control units 10B, 10C) are realized by executing predetermined software (programs) saved in a storage section (e.g., the storage section 24). The various functions of the motor control unit 10A may be realized by cooperation between hardware and software, or may be realized by only hardware (electrical circuits).

Figure 3:
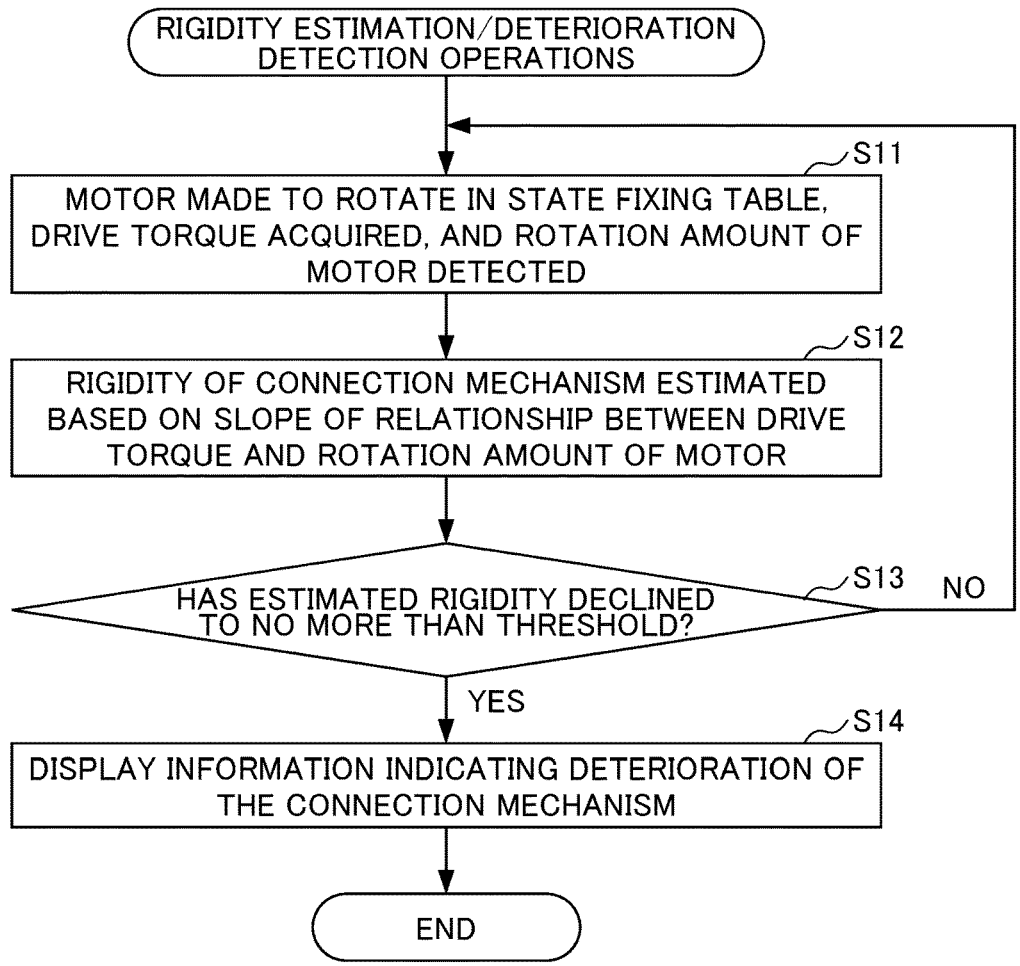
FIG. 3 is a flowchart showing operations of rigidity estimation and deterioration detection of a connection mechanism by way of a servomotor control device according to the first embodiment of the present invention.
Figure 4:
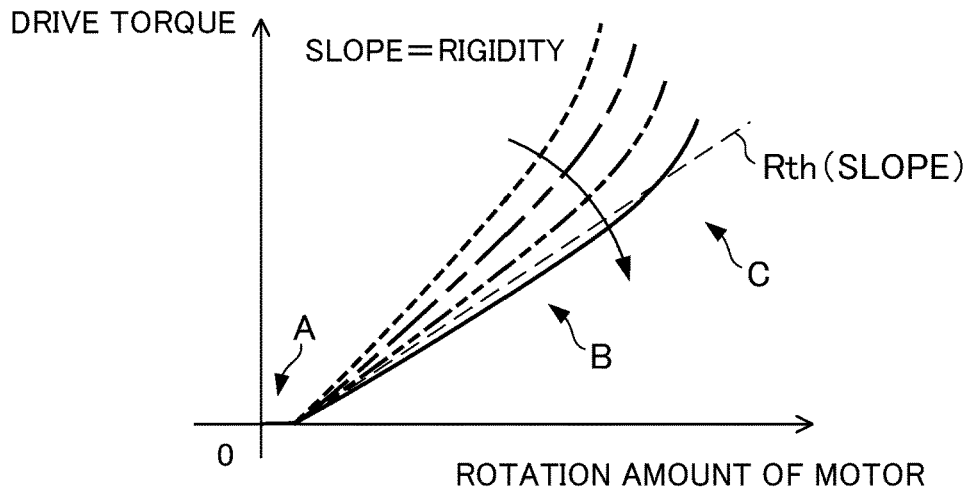
FIG. 4 is a graph showing the relationship between drive torque and rotation amount of the servomotor during a rigidity estimation operation.

Next, the operations of rigidity estimation and deterioration detection for the connection mechanism 60 by way of the servomotor control device 1A of the first embodiment will be explained by referencing FIGS. 3 and 4. FIG. 3 is a flowchart showing operations of rigidity estimation and deterioration detection for the connection mechanism 60 according to the servomotor control device 1A of the first embodiment. FIG. 4 is a graph showing the relationship between the drive torque and rotation amount of the servomotor 50 during the rigidity estimation operation.

First, in Step S11, the motor control unit 10A causes the servomotor 50 to rotate in a state mechanically fixed to the table 70, and detects the rotation amount of the servomotor 50, along with acquiring the drive torque acting on the table 70 at the connection part between the table 70 (nut 63) and connection mechanism 60.

More specifically, the motor control unit 10A causes the table 70 to move in the arrow direction in FIG. 2 by causing the servomotor 50 to rotate at low speed, and then abuts the table 70 to be fixed against a fixing part 80 provided to the machine tool. As the fixing part 80, it may be a member provided exclusively for deterioration detection in the vicinity of the connection mechanism 60, or may be a mobile part of the machine tool made to move to the vicinity of the connection mechanism 60. As the mobile part, it may be a spindle provided with a fixing part, the arm of a robot which performs picking up and putting down of works, or the like.

Then, the motor control unit 10A supplies a torque command according to the position command (movement command) to the servomotor 50. The torque command supplied to the servomotor 50 is a value within a range normally used (e.g., rated torque). At this time, the position of the servomotor 50, i.e. rotation amount, is detected by the encoder 40 of the servomotor 50. In addition, the force acquisition section 20 acquires the drive torque acting on the table 70 at the connection part between the table 70 (nut 63) and connection mechanism 60, based on the torque command from the torque command generation section 16.

Herein, in a case of not fixing the table 70, the drive torque acting on the table 70 at the connection part will be less than the torque command value due to friction, etc. in the machine tool (e.g., the sliding guides of the connection mechanism 60). However, in the case of mechanically fixing the table 70, the drive torque acting on the table 70 at the connection part will be equal to the torque command value.

Next, in Step S12, the rigidity estimation section 22 estimates the magnitude of rigidity of the connection mechanism 60, based on the drive torque acquired by the force acquisition section 20, and the rotation amount of the servomotor 50 detected by the encoder 40. The rigidity is expressed by a ratio of deformation amount relative to the applied force. In the state fixing the table 70, the rigidity is thereby expressed by the slope of the relationship between the drive torque and rotation amount or the motor. As shown in FIG. 4, the rigidity estimation section 22 thereby obtains the slope of the relationship between the drive torque and the rotation amount of the motor to estimate this slope as the magnitude of the rigidity of the connection mechanism 60.

In FIG. 4, in the portion A, the servomotor 50 rotates by the approach to abut the table 70 against the fixing part 70, and the amount of play in the connection part between the table 70 (nut 63) and connection mechanism 60. At this time, the drive torque does not act on the table 70. Subsequently, in the portion B, the drive torque acting on the table 70 rises, and the servomotor 50 rotates little by little due to the elastic deformation according to the portion in which the rigidity is relatively soft in the connection mechanism 60. When elastic deformation in the portion in which rigidity is relatively soft in the connection mechanism 60 ends, in the portion C, the servomotor 50 further rotates little by little due to elastic deformation according to the portion in which the rigidity is relatively hard in the connection mechanism 60.

In the present embodiment, the slope of the portion B which is relatively linear shall be the magnitude of rigidity of the connection mechanism 60. It should be noted that the slope of the portion B also has the influence of friction of the machine tool (e.g., sliding guides in connection mechanism 60), in addition to the elastic deformation of the connection mechanism 60. Consequently, the rigidity estimated by the rigidity estimation section 22 in the present embodiment includes elastic deformation and the influence of friction.

Herein, the rigidity of the connection mechanism ages (declines) as shown by the arrow in FIG. 4. For example, the rigidity of the ball screw 62 in the connection mechanism 60 declines due to the pre-loading weakening with time. Since the machining precision of the machine tool declines if the rigidity declines, maintenance of the connection mechanism 60 is necessary.

Therefore, in Step S13, the deterioration detection section 28A detects the deterioration of the connection mechanism 60, based on the magnitude of rigidity estimated by the rigidity estimation section 22. More specifically, the deterioration detection section 28A determines whether or not the magnitude of rigidity estimated by the rigidity estimation section 22 has declined to no more than a threshold Rth stored in the storage section 24. Generally, a margin on the order of 20% to 30% is established in the gain of the control loop of the motor control unit 10A so as to satisfy the specifications of machining precision even if the rigidity of the connection mechanism 60 declines. The threshold Rth is thereby set to on the order of 70% of the initial value for rigidity, for example.

In Step S13, in the case of the magnitude of rigidity having declined to no more than the threshold Rth, the deterioration detection section 28A detects deterioration of the connection mechanism 60. At this time, in Step S14, the display section 30 displays information indicating deterioration of the connection mechanism 60.

On the other hand, in Step S13, in the case of the magnitude of rigidity being greater than the threshold Rth, the motor control unit 10A returns to Step S11 after a predetermined time elapse, and repeats the aforementioned operation. It should be noted that the motor control unit 10A is not limited to after a fixed time (predetermined time) elapse set in advance, and may repeat the aforementioned operation after an irregular time elapse (at indefinite time intervals).

It should be noted that, in Step S12, the rigidity estimation section 22 may store the estimated magnitude of rigidity in the storage section 24. In addition, in Step S13, the deterioration detection section 28A may detect deterioration of the connection mechanism 60, based on the latest magnitude of rigidity stored in the storage section 24.

As explained above, with the servomotor control device 1A of the present embodiment, the rigidity estimation section 22 estimates the magnitude of rigidity of the connection mechanism 60, based on the rotation amount (position information) of the servomotor 50 and the drive torque acquired by the force acquisition section 20 when causing the servomotor 50 to rotate in a state mechanically fixing the table 70. It is thereby possible to estimate the magnitude of rigidity of the connection mechanism 60 (particularly the coupling 61 and ball screw 62) connecting the servomotor 50 and the table (driven body) 70, using only the rotation amount (semi-closed feedback value) of the servomotor 50 acquired from the encoder 40 of the servomotor 50, without using full-closed feedback values from a linear scale provided on the table as in Patent Documents 1 and 2.

In addition, with the servomotor control device 1A of the present embodiment, since the deterioration detection section 28A detects deterioration of the connection mechanism 60 based on the magnitude of rigidity estimated by the rigidity estimation section 22, it is possible to confirm the existence of the necessity for maintenance of the connection mechanism 60.

In addition, with the servomotor control device 1A of the present embodiment, since the display section 30 displays information indicating deterioration of the connection mechanism 60, it is possible for a user to confirm the existence of the necessity for maintenance of the connection mechanism 60.

It should be noted that the servomotor control device 1A of the present embodiment, since being a form that performs deterioration detection of the connection mechanism 60 with only the information of its own machine, can perform deterioration detection even if riot connected to a network. In this case, the motor control unit 10A of the servomotor control device 1A does not need to include the communication section 26 shown in FIG. 2.

(Servomotor Control Device according to Second Embodiment)

In the first embodiment, deterioration of the connection mechanism 60 is detected every time estimating the magnitude of rigidity in its own device. In the second embodiment, the magnitude of rigidity of its own device is estimated every predetermined time interval or indefinite time interval, this plurality of magnitudes of rigidity is stored as rigidity data, and the aging (change) (decline) in rigidity and variation thereof (amount of change) (amount of decline) is detected based on the stored rigidity data.

Figure 5:
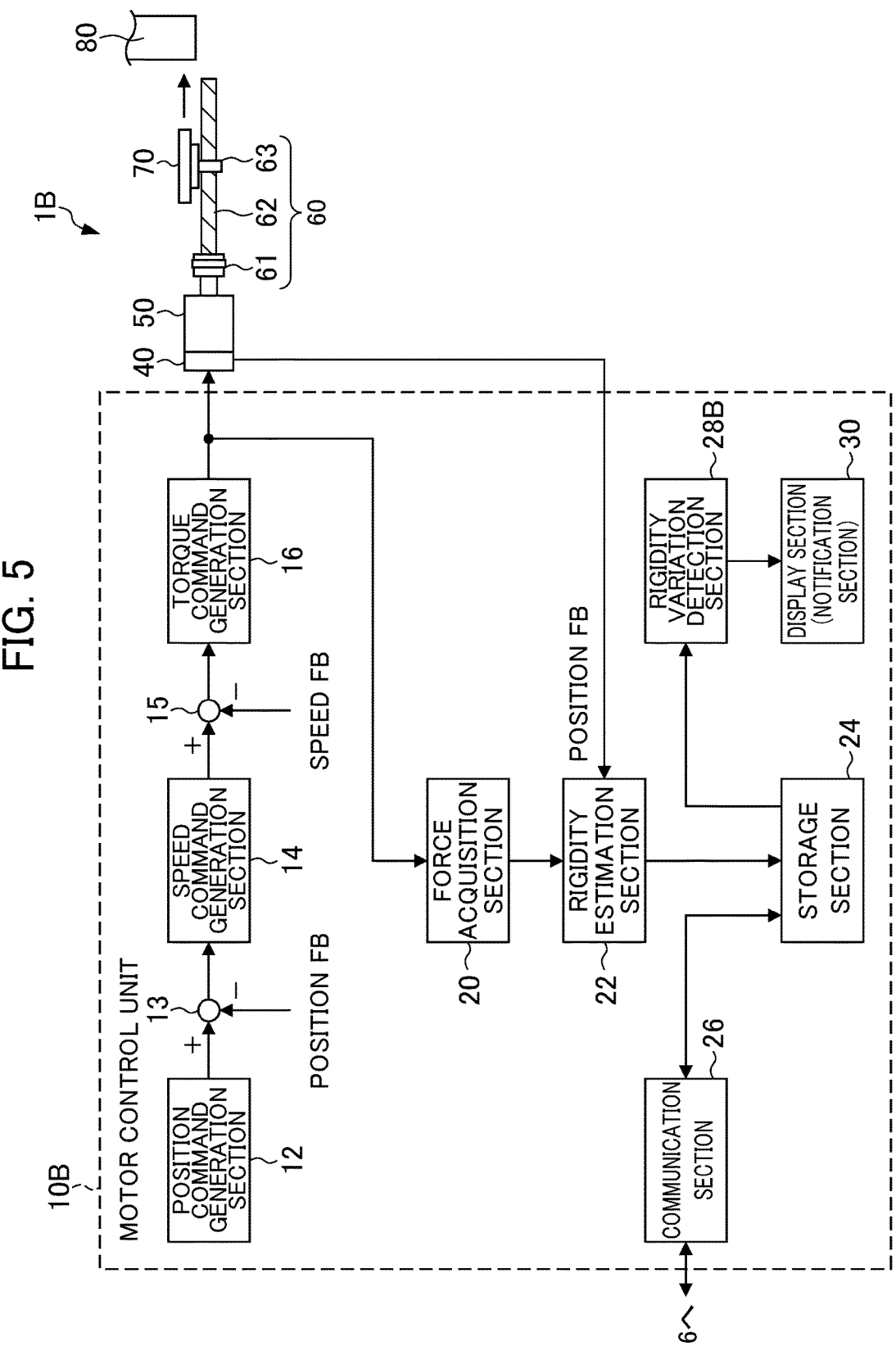
FIG. 5 is a view showing the configuration of a servomotor control device according to a second embodiment of the present invention.

FIG. 5 is a view showing the configuration of the servomotor control device according to the second embodiment of the present invention. A servomotor control device 1B of the second embodiment shown in FIG. 5 differs from the first embodiment in the point of including a motor control unit 10B in place of the motor control unit 10A of the servomotor control device 1A shown in FIG. 2. In addition, the motor control unit 10B differs from the first embodiment in the point of including a rigidity variation detection section 28B in place of the deterioration detection section 28A of the motor control unit 10A shown in FIG. 2. It should be noted that the servomotor control device 1B and motor control unit 10B are examples of the servomotor control device 1 and motor control unit 10 of FIG. 1.

The storage section 24 stores a plurality of magnitudes of rigidity of its own device estimated by the rigidity estimation section 22 at every predetermined time interval to be associated with the operating amounts (e.g., hours) at this time as rigidity data. It should be noted that the storage section 24 is not limited to every fixed time interval set in advance (predetermined. time interval), and may store the plurality of magnitudes of rigidity of its own device at every irregular time interval (indefinite time interval) to be associated with the operating amounts (e.g., time) at this time as rigidity data.

The rigidity variation detection section 28B detects an aging (change) (decline) in rigidity of the connection mechanism 60 and variation thereof (amount of decline) based on the rigidity data stored in the storage section 24.

The display section 30 displays information indicating the aging (change) (decline) in rigidity of the connection mechanism 60 detected by the rigidity variation. detection section 28B, and the variation thereof (amount of decline).

Figure 6:
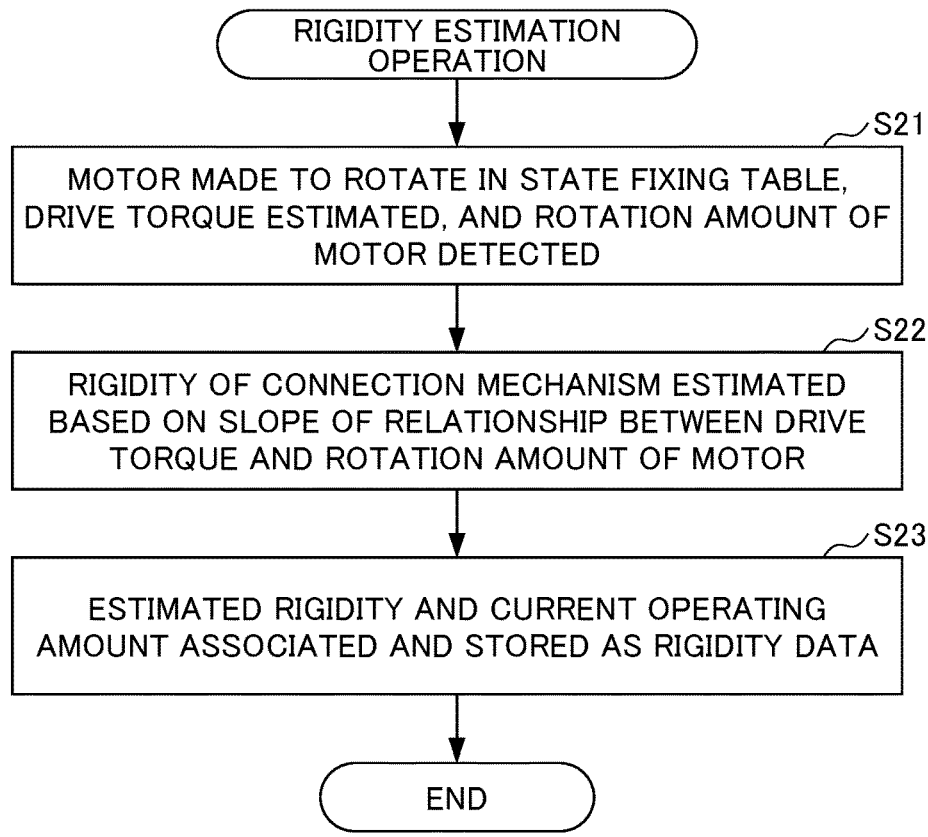
FIG. 6 is a flowchart showing a rigidity estimation operation for the connection mechanism by way of the servomotor control device according to the second embodiment of the present invention.
Figure 7:
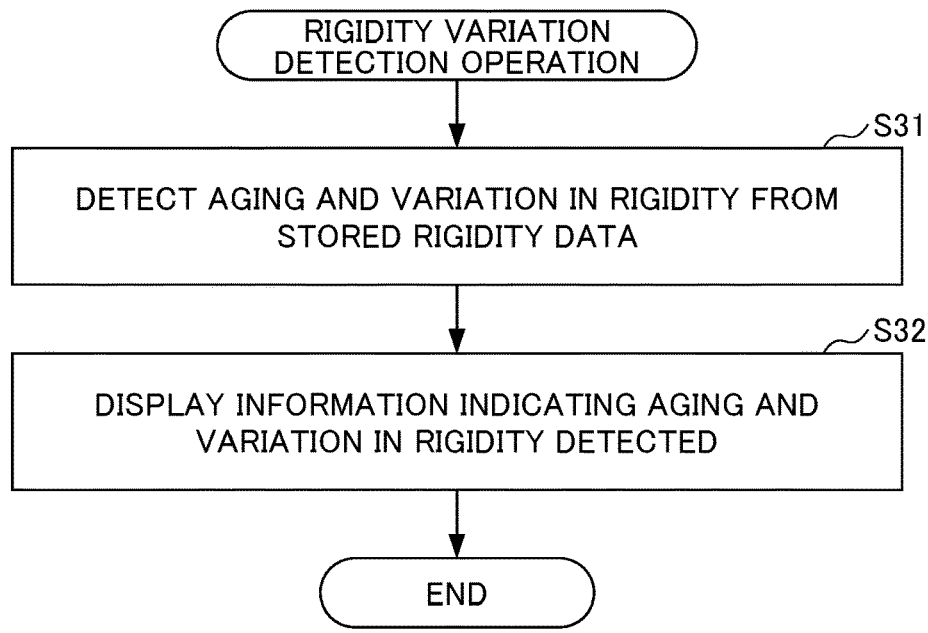
FIG. 7 is a flowchart showing a rigidity variation detection operation for the connection mechanism by way of the servomotor control device according to the second embodiment of the present invention.

Next, the rigidity estimation operation and rigidity variation detection operation for the connect on mechanism 60 by way of the servomotor control device 1B of the second embodiment will be explained by referencing FIG. 6 and FIG. 7. FIG. 6 is a flowchart showing the rigidity estimation operation for the connection mechanism 60 by way of the servomotor control device 1B of the second embodiment, and FIG. 7 is a flowchart showing the rigidity variation detection operation for the connection mechanism 60 by way of the servomotor control device 1B of the second embodiment.

(Rigidity Estimation Operation)

First, in Step S21 of FIG. 6, similarly to Step S11 in FIG. 3 mentioned above, the motor control unit 10B causes the servomotor 50 to rotate in a state mechanically fixing the table 70, and acquires the drive torque acting on the table 70 at the connection part between the table 70 (nut 63) and connection mechanism 60, along with detecting the rotation amount of the servomotor 50.

Next, in Step S22, similarly to Step S12 of FIG. 3 mentioned above, the rigidity estimation section 22 estimates the magnitude of rigidity of the connection mechanism 60, based on the slope of the relationship between the drive torque acquired by the force acquisition section 20, and the rotation amount of the servomotor 50 detected by the encoder 40.

Next, in Step S23, the rigidity estimation section 22 stores the estimated magnitude of rigidity in the storage section 24 to be associated with the current operating amount as rigidity data.

The motor control unit 10B repeats the aforementioned operations of Steps S21 to S23 at every predetermined time interval. The rigidity data in which a plurality of magnitudes of rigidity estimated at every predetermined time interval and the operating amounts are associated is thereby stored in the storage section 24. It should be noted that the motor control unit 10B may repeat the aforementioned operations of Steps S21 to S23 at every irregular time interval (indefinite time intervals). In this case, the rigidity data in which a plurality of magnitudes of rigidity estimated at every irregular time interval (indefinite time interval) and the operating amounts are associated is stored in the storage section 24.

(Rigidity Variation Detection Operation)

In Step S31 of FIG. 7, the rigidity variation detection section 28B detects aging (change) (decline) in rigidity of the connection mechanism 60 and the variation thereof (amount of decline), based on the rigidity data stored in the storage section 24.

Next, in Step S32, the display section 30 displays information indicating the aging (change) (decline) in rigidity and variation thereof (amount of decline) detected by the rigidity variation detection section 28B.

Also with the servomotor control device 1B of the present embodiment, the rigidity estimation section 22 estimates the magnitude of rigidity of the connection mechanism 60 based on the rotation amount (position information) of the servomotor 50 and the drive torque acquired by the force acquisition section 20 when causing the servomotor 50 to rotate in a state mechanically fixing the table 70. It is thereby possible to estimate the magnitude of rigidity of the connection mechanism 60 (particularly the coupling 61 and ball screw 62) connecting the servomotor 50 and the table (driven body) 70, using only the rotation amount (semi-closed feedback value) of the servomotor 50 acquired from the encoder 10 of the servomotor 50, without using full-closed feedback values from a linear scale provided on the table as in Patent Documents 1 and 2.

In addition, with the servomotor control device 1B of the present embodiment, the rigidity variation detection section 28B detects the aging (change) (decline) in rigidity of the connection mechanism 60 and the variation thereof (amount of decline), based on the rigidity data stored in the storage section 24, which includes a plurality of magnitudes of rigidity estimated by the rigidity estimation section 22 at every predetermined time interval or indefinite time interval; therefore, it is possible to confirm the existence of the necessity for maintenance of the connection mechanism 60.

In addition, with the servomotor control device 1B of the present embodiment, since the display section 30 displays information indicating the aging (change) (decline) in rigidity of the connection mechanism 60 and variation thereof (amount of decline), the user can confirm the existence of the necessity for maintenance of the connection mechanism.

It should be noted that the servomotor control device 1B of the present embodiment, due to being a form that performs rigidity variation detection of the connection mechanism 60 with only information of its own device, can perform rigidity variation detection even if not connected to a network. In this case, the motor control unit 10B of the servomotor control device 1B does not need to include the communication section 26 shown in FIG. 2.

In addition, the servomotor control device 1B of the present embodiment may store rigidity data in a storage section 5 of an external server device 4. In this case, in the rigidity estimation operation of FIG. 6, the rigidity data in which a plurality of magnitudes of rigidity estimated by the rigidity estimation section 22 at every predetermined time interval or indefinite time interval and the operating amounts are associated is sent to the storage section 5 of the server device 4 via a network 6 by way of the communication section 26, and is stored in the storage section 5. Then, in the rigidity variation detection operation of FIG. 7, the rigidity data is acquired from the storage section 5 of the server device 4 via the network 6 by the communication section 26, and the rigidity variation detection section 28B detects an aging (change) and variation in the rigidity of the connection mechanism 60, based on the acquired rigidity data.

(Servomotor Control Device According to Third Embodiment)

In a third embodiment, rigidity data is mutually shared with other devices, a trend for aging (change) in rigidity is derived based on the rigidity data of other devices having many operating hours, for example, and the remaining operable amount of the connection mechanism 60 is estimated based on this trend and the magnitude of the current rigidity of its own device.

Figure 8:
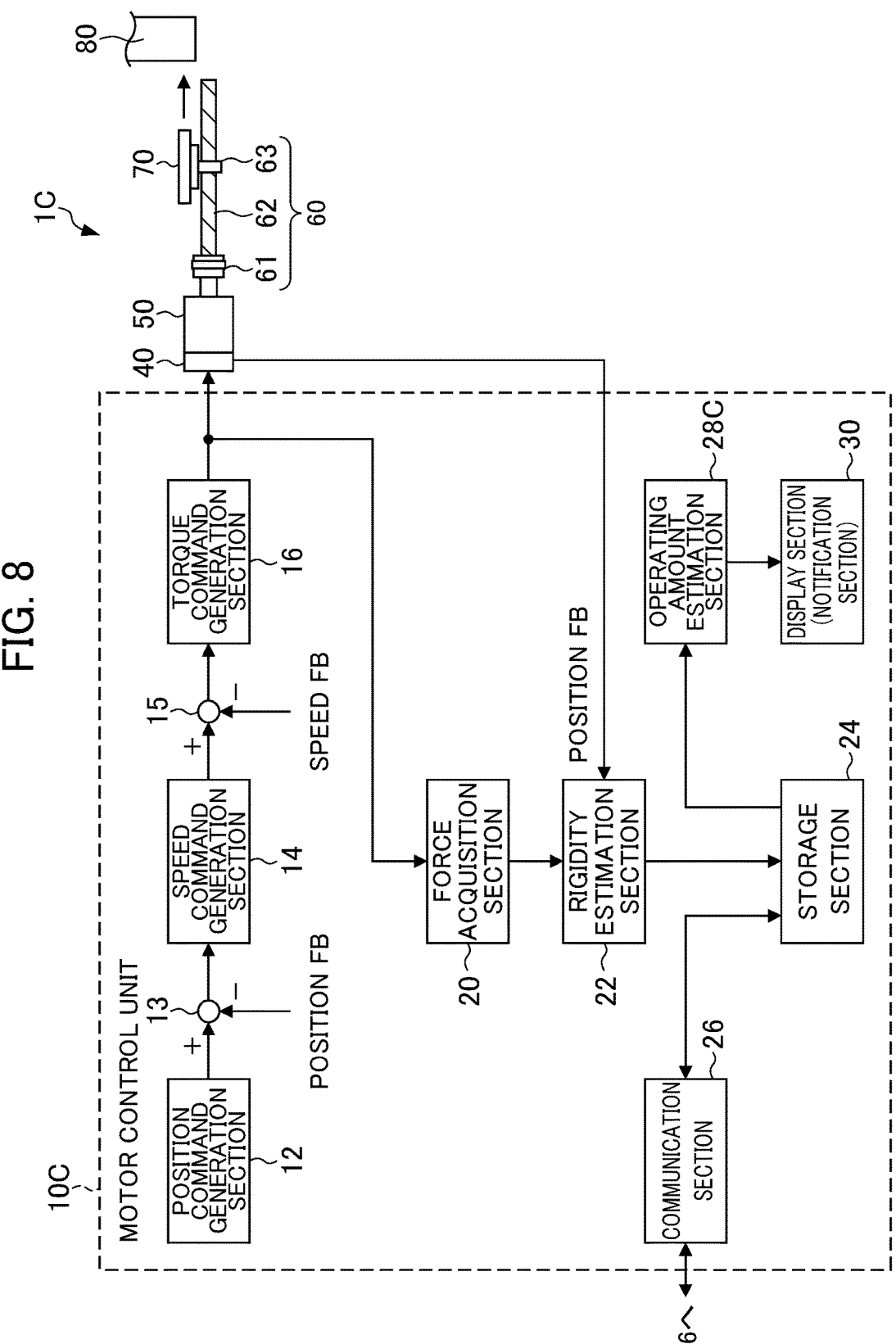
FIG. 8 is a view showing the configuration of a servomotor control device according to a third embodiment of the present invention.

FIG. 8 is a view showing the configuration of a servomotor control device according to the third embodiment of the present invention. A servomotor control device 1C according to the third embodiment shown in FIG. 8 differs from the first embodiment in the point of including a motor control unit 10C in place of the motor control unit 10A of the servomotor control device 1A shown in FIG. 2. In addition, the motor control unit 10C differs from the first embodiment in the point of including an operating amount estimation section 28C in place of the deterioration detection section 28A of the motor control unit 10A shown in FIG. 2. It should be noted that the servomotor control device 1C and motor control unit 10C are examples of the servomotor control device 1 and motor control unit 10 of FIG. 1.

The storage section 24 stores rigidity data in which a plurality of magnitudes of rigidity every predetermined time interval or indefinite time interval of another device 1 and the operating amount at this time are associated.

The operating amount estimation section 28C derives the trend for aging (change) in rigidity based on the rigidity data of another device stored in the storage section 24, and estimates the remaining operable amount of the connection mechanism 60 until the magnitude of rigidity declines to no more than the threshold, based on the derived trend for aging (change) in rigidity and the rigidity data of its own device.

The display section 30 displays information indicating the remaining operable amount of the connection mechanism 60 estimated by the operating amount estimation section 28C.

Figure 9:
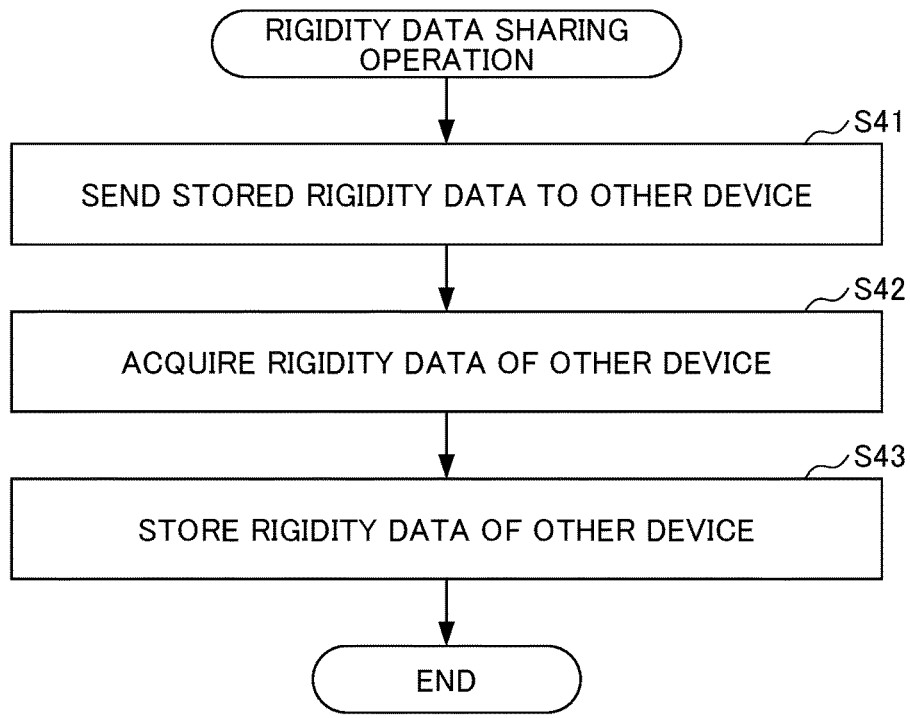
FIG. 9 is a flowchart showing a rigidity data sharing operation for the connection mechanism by way of the servomotor control device according to the third embodiment of the present invention.
Figure 10:
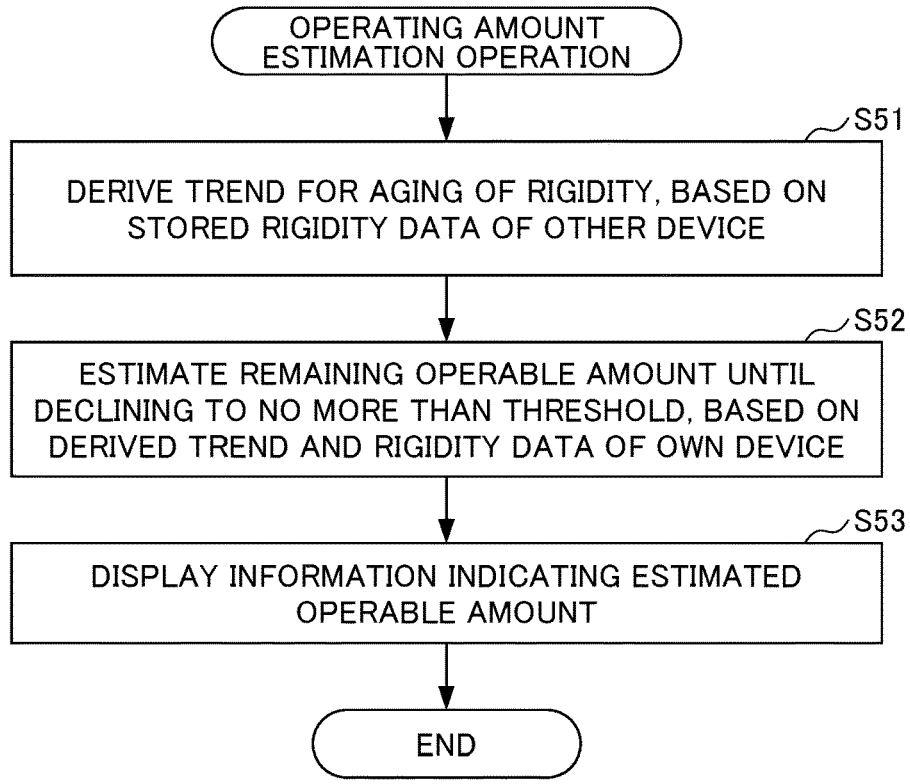
FIG. 10 is a flowchart showing an operating amount estimation operation for the connection mechanism by way of the servomotor control device according to the third embodiment of the present invention.
Figure 11:
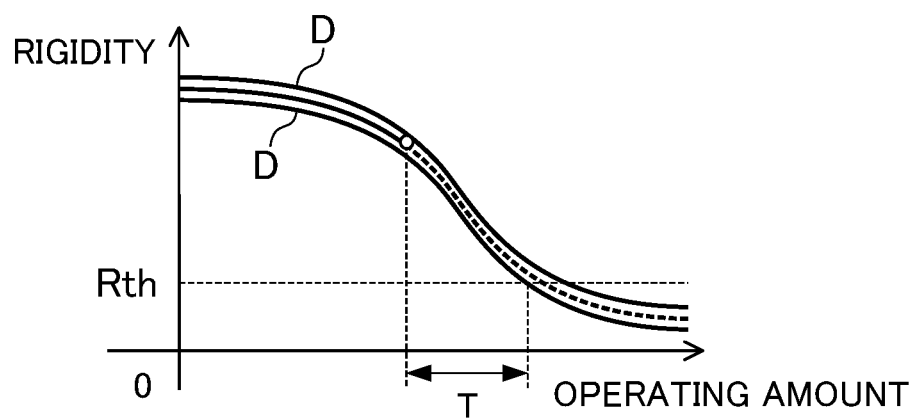
FIG. 11 is a view showing the relationship between rigidity and operating amount, i.e. trend for aging in rigidity.

Next, the rigidity estimation operation for the connection mechanism 60, the rigidity data sharing operation and the operating amount estimation operation by the servomotor control device 1C of the third embodiment will be explained by referencing FIGS. 6, and 9 to 11. FIG. 9 is a flowchart showing the rigidity data sharing operation by the servomotor control device 1C of the third embodiment, and FIG. 10 is a flowchart showing the operating amount estimation operation of the connection mechanism 60 by the servomotor control device 1C of the third embodiment. FIG. 11 is a graph showing the relationship between rigidity and operating amount, i.e. trend for aging of rigidity.

(Rigidity Estimation Operation)

Rigidity estimation operation is performed also by the servomotor control device 1C of the present embodiment similarly to the aforementioned FIG. 6. Rigidity data in which a plurality of magnitudes of rigidity of its own device estimated at every predetermined time interval or indefinite time interval and the operating amounts are associated is thereby stored in the storage section 24.

(Rigidity Data Sharing Operation)

First, in Step S41 of FIG. 9, the rigidity data of its own device stored in the storage section 24 is sent to another device via the network 6 by the communication section 26. In addition, in Step S42, the rigidity data of another device 1 in which a plurality of magnitudes of rigidity at every predetermined time interval or indefinite time interval and the operating amounts are associated is acquired via the network 6 from the other device 1 by way of the communication section 26. Then, in Step S43, the acquired rigidity data of the other device 1 is stored in the storage section 24.

(Operating Amount Estimation Operation)

In Step S51 of FIG. 10, the operating amount estimation section 28C derives a trend D for aging (change) in rigidity as shown in FIG. 11, based on the rigidity data of the other device 1 stored in the storage section 24.

Next, in Step S52, the operating amount estimation section 28C estimates a remaining operable amount T of the connection mechanism 60 until the magnitude of rigidity declines to no more than the threshold Rth as shown in FIG. 11, based on the derived trend D for aging (change) in rigidity and the rigidity data of its own device stored in the storage section 24.

Next, in Step S53, the display section 30 displays information indicating the remaining operable amount of the connection mechanism 60 estimated by the operating amount estimation section 28C.

Also with the servomotor control device 1C of the present embodiment, the rigidity estimation section 22 estimates the magnitude of rigidity of the connection mechanism 60, based on the rotation amount (position information) of the servomotor 50 and the drive torque acquired by the force acquisition section 20 when causing the servomotor to rotate in a state mechanically fixing the table 70. It is thereby possible to estimate the magnitude of rigidity of the connection mechanism 60 (particularly the coupling 61 and ball screw 62) connecting the servomotor 50 and the table (driven body) 70, using only the rotation amount (semi-closed feedback value) of the servomotor 50 acquired from the encoder 40 of the servomotor 50, without using full-closed feedback values from a linear scale provided on the table as in Patent Documents 1 and 2.

In addition, with the servomotor control device 1C of the present embodiment, the operating amount estimation section 28C derives the trend for aging (change) in rigidity based on the rigidity data of another device, and estimates the remaining operable amount of the connection mechanism until the magnitude of rigidity declines to no more than a predetermined second threshold based on the derived trend for aging (change) in rigidity and the rigidity data of its own device; therefore, it is possible to confirm the existence of the necessity for maintenance of the connection mechanism 60 and the operating amount until maintenance becomes necessary.

In addition, with the servomotor control device 1C of the present embodiment, since the display section 30 displays information indicating the remaining operable amount of the connection mechanism 60, a user can confirm the existence of the necessity for maintenance of the connection mechanism 60 and the operating amount until maintenance becomes necessary.

It should be noted that, although the servomotor control device IC of the present embodiment derives the trend for aging (change) in rigidity based on the rigidity data of another device, it may store trend data indicating the trend for aging (change) in rigidity measured in advance in the storage section 24. In this case, the operating amount estimation section 28C may estimate the remaining operable amount of the connection mechanism 60, based on the trend for aging (change) in rigidity indicated by this trend data and the rigidity data of its own device. In this form, it is possible to estimate the remaining operable amount even if not connected to a network. In this case, the motor control unit 10C of the servomotor control device 1C does not need to include the communication section 26 shown in FIG. 2.

In addition, with the servomotor control device 1C of the present embodiment, the rigidity data of its own device may also be stored in the storage section 5 of the external server device 4. In this case, in the rigidity estimation operation of FIG. 6, the rigidity data of its own device in which a plurality of magnitudes of rigidity estimated by the rigidity estimation section 22 at every predetermined time interval or indefinite time interval and the operating amounts are associated is sent to the storage section 5 of the server device 4 via a network 6 by way of the communication section 26, and is stored in the storage section 5. Then, in the operating amount estimation operation of FIG. 10, the rigidity data of its own device and the rigidity data of another device are acquired via a network by the communication section 26, and the operating amount estimation section 28C derives a trend for aging (change) in rigidity based on the acquired rigidity data of another device, and estimates the remaining operable amount of the connection mechanism 60 based on the derived trend for aging (change) in rigidity and the acquired rigidity data of its own device.

Although embodiments of the present invention have been explained above, the present invention is not to be limited to the aforementioned embodiments. In addition, the effects described in the present embodiment are merely exemplifying the most preferred effects produced from the present invention, and the effects according to the present invention are not limited to those described in the present embodiment.

For example, the aforementioned embodiments may be modified as appropriate, and may be realized by being combined. For example, the first embodiment and second embodiment may be combined so that, in the case of the magnitude of the current rigidity being larger than the threshold, the aging (change) in rigidity and variation are detected and displayed, and in the case of the magnitude of the current rigidity having declined to no more than the threshold, the deterioration in rigidity is detected and displayed. In addition, the first embodiment and the second embodiment may be combined so that, in the case of the magnitude of the current rigidity being greater than the threshold, the remaining operable amount is estimated and displayed, and in the case of the magnitude of the current rigidity having declined to no more than the threshold, the deterioration in rigidity is detected and displayed.

In addition, in the aforementioned embodiments, a display section is exemplified as an example of a notification section; however, the notification section is not limited thereto. For example, the notification section may be a light emitting part such as one or a plurality of LEDs. In the case of being one LED, different information may be notified by way of illuminating, flashing, and the like. In addition, in the case of being a plurality of LEDs, different information may be notified by way of the number illuminated of the same color, or different colors. In addition, for example, the notification section may be a sound generating unit such as for a buzzer sound or voice.

In addition, in the aforementioned embodiment, a form performing position control based on a position command is exemplified as the servomotor control device; however, the features of the present invention are also applicable to forms that perform speed control based on a speed command.

EXPLANATION OF REFERENCE NUMERALS 1, 1A, 1B, 1C servomotor control device
4 servo device
5 storage section
6 network
10, 10A, 10B, 10C motor control unit
12 position command generation section
13, 15 subtracter
14 speed command generation section
16 torque command generation section
20 force acquisition section
22 rigidity estimation section
24 storage section
26 communication section
28A deterioration detection section
26B rigidity variation detection section
28C operating amount estimation section
30 display section (notification section)
40 encoder
50 servomotor
60 connection mechanism
61 coupling
62 ball screw
63 nut
70 table (driven body)
80 fixing part
100 servomotor control system

What is claimed is:

1. A servomotor control device comprising:
   a servomotor;
   a driven body that is driven by way of the servomotor;
   a connection mechanism that connects the servomotor and the driven body to transmit power of the servomotor to the driven body; and
   a motor control unit that controls the servomotor, wherein the motor control unit includes:
      a force acquisition section that acquires a torque command value or actual torque for the servomotor, as a drive force acting on the driven body at a connection part between the connection mechanism and the driven body;
      a rigidity estimation section that, based on position information of the servomotor and a drive force acquired by the force acquisition section when causing the servomotor to rotate in a state mechanically fixing the driven body, obtains slope of relationship between the drive force acting on the driven body at the connection part between the connection mechanism and the driven body and the position information of the servomotor, and estimates the slope as a magnitude of rigidity of the connection mechanism;
      a storage section that stores a plurality of magnitudes of rigidity estimated by the rigidity estimation section at every predetermined fixed time interval or irregular time interval, as rigidity data; and
      a rigidity variation detection section that detects a change and variation in the rigidity of the connection mechanism, based on the rigidity data stored in the storage section.

2. The servomotor control device according to claim 1, wherein the motor control unit further includes a deterioration detection section that detects deterioration of the connection mechanism based on the magnitude of rigidity estimated by the rigidity estimation section.

3. The servomotor control device according to claim 2, wherein the deterioration detection section detects deterioration of the connection mechanism, when the magnitude of rigidity estimated by the rigidity estimation section has declined to no more than a predetermined first threshold.

4. The servomotor control device according to claim 2, wherein the motor control unit further includes a notification section that notifies of information indicating the deterioration detected by the deterioration detection section.

5. The servomotor control device according to claim 4, wherein
   the notification section is a display device that displays information.

6. The servomotor control device according to claim 1, wherein the motor control unit further includes a notification section that notifies of information indicating at least one of the change and variation in rigidity detected by the rigidity variation detection section.

7. A servomotor control device comprising:
   a servomotor;
   a driven body that is driven by way of the servomotor;
   a connection mechanism that connects the servomotor and the driven body to transmit power of the servomotor to the driven body; and
   a motor control unit that controls the servomotor, wherein the motor control unit includes:
      a force acquisition section that acquires a torque command value or actual torque for the servomotor, as a drive force acting on the driven body at a connection part between the connection mechanism and the driven body;
      a rigidity estimation section that, based on position information of the servomotor and a drive force acquired by the force acquisition section when causing the servomotor to rotate in a state mechanically fixing the driven body, obtains slope of relationship between the drive force acting on the driven body at the connection part between the connection mechanism and the driven body and the position information of the servomotor, and estimates the slope as a magnitude of rigidity of the connection mechanism;
      a communication section that performs communication with another servomotor control device;
      a storage section that stores rigidity data of its own device in which a plurality of magnitudes of rigidity of its own device estimated by the rigidity estimation section at every predetermined fixed time interval or irregular time interval and operating amounts are associated, and stores rigidity data of another device, in which a plurality of magnitudes of rigidity of another device at every predetermined fixed time interval or irregular time interval and operating amounts are associated, acquired by the communication section; and
      an operating amount estimation section that derives a trend for change in rigidity based on the rigidity data of another device stored in the storage section, and estimates a remaining operable amount of the connection mechanism until the magnitude of rigidity declines to no more than a predetermined second threshold, based on the trend for change in rigidity thus derived, and the rigidity data of its own device stored in the storage section.

8. The servomotor control device according to claim 7, wherein the motor control unit further includes a notification section that notifies information indicating the operable amount estimated by the operating amount estimation section.

9. A servomotor control device comprising:
   a servomotor;
   a driven body that is driven by way of the servomotor;
   a connection mechanism that connects the servomotor and the driven body to transmit power of the servomotor to the driven body; and
   a motor control unit that controls the servomotor, wherein the motor control unit includes:
      a force acquisition section that acquires a torque command value or actual torque for the servomotor, as a drive force acting on the driven body at a connection part between the connection mechanism and the driven body;
      a rigidity estimation section that, based on position information of the servomotor and a drive force acquired by the force acquisition section when causing the servomotor to rotate in a state mechanically fixing the driven body, obtains slope of relationship between the drive force acting on the driven body at the connection part between the connection mechanism and the driven body and the position information of the servomotor, and estimates the slope as a magnitude of rigidity of the connection mechanism;
      a storage section that stores rigidity data of its own device in which a plurality of magnitudes of rigidity of its own device estimated by the rigidity estimation section at every predetermined fixed time interval or irregular time interval and operating amounts are associated, and stores in advance trend data indicating a trend for change in rigidity of the connection mechanism; and an operating amount estimation section that estimates a remaining operable amount of the connection mechanism until the magnitude of rigidity declines to no more than a predetermined second threshold, based on the trend for change in rigidity indicated by the trend data stored in the storage section, and the rigidity data of its own device stored in the storage section.

10. A servomotor control device comprising:

a servomotor;

a driven body that is driven by way of the servomotor;

a connection mechanism that connects the servomotor and the driven body to transmit power of the servomotor to the driven body; and a motor control unit that controls the servomotor, wherein the motor control unit includes:

a force acquisition section that acquires a torque command value or actual torque for the servomotor, as a drive force acting on the driven body at a connection part between the connection mechanism and the driven body;

a rigidity estimation section that, based on position information of the servomotor and a drive force acquired by the force acquisition section when causing the servomotor to rotate in a state mechanically fixing the driven body, obtains slope of relationship between the drive force acting on the driven body at the connection part between the connection mechanism and the driven body and the position information of the servomotor, and estimates the slope as a magnitude of rigidity of the connection mechanism;

a communication section that sends a plurality of magnitudes of rigidity estimated by the rigidity estimation section at every predetermined fixed time interval or irregular time interval as rigidity data to an external storage section, and acquires the rigidity data stored in the external storage section; and a rigidity variation detection section that detects a change and variation in rigidity of the connection mechanism, based on the rigidity data acquired by the communication section from the external storage section.

11. A servomotor control system comprising:

the servomotor control device according to claim 10; and a server device that is connected to the servomotor control device and includes the external storage section.

12. A servomotor control device comprising:

a servomotor;

a driven body that is driven by way of the servomotor;

a connection mechanism that connects the servomotor and the driven body to transmit power of the servomotor to the driven body; and a motor control unit that controls the servomotor, wherein the motor control unit includes:

a force acquisition section that acquires a torque command value or actual torque for the servomotor, as a drive force acting on the driven body at a connection part between the connection mechanism and the driven body;

a rigidity estimation section that, based on position information of the servomotor and a drive force acquired by the force acquisition section when causing the servomotor to rotate in a state mechanically fixing the driven body, obtains slope of relationship between the drive force acting on the driven body at the connection part between the connection mechanism and the driven body and the position information of the servomotor, and estimates the slope as a magnitude of rigidity of the connection mechanism;

a communication section that sends rigidity data of its own device, in which a plurality of magnitudes of rigidity of its own device estimated by the rigidity estimation section at every predetermined fixed time interval or irregular time interval and operating amounts are associated, to an external storage section, and acquires the rigidity data of its own device and rigidity data of another device, in which a plurality of magnitudes of rigidity at every predetermined fixed time interval or irregular time interval and operating amounts are associated, stored in the external storage section; and an operating amount estimation section that derives a trend for change in rigidity based on the rigidity data of another device acquired by the communication section from the external storage section, and estimates a remaining operable amount of the connection mechanism until the magnitude of rigidity declines to no more than a predetermined second threshold, based on the trend for change in rigidity thus derived and the rigidity data of its own device acquired by the communication section from the external storage section.

* * * * *